United States Patent
Eber et al.

(10) Patent No.: US 6,831,548 B1
(45) Date of Patent: Dec. 14, 2004

(54) DATA CARRIER WITH MEANS FOR REDUCING THE POWER CONSUMPTION UPON RECEPTION OF DATA

(75) Inventors: Wolfgang Eber, Graz (AT); Peter Thüringer, Graz (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/372,460

(22) Filed: Aug. 11, 1999

(30) Foreign Application Priority Data

Aug. 17, 1998 (EP) .......................................... 98890238

(51) Int. Cl.[7] .............................................. H04Q 5/22
(52) U.S. Cl. ................................ 340/10.33; 340/10.44
(58) Field of Search ........................... 340/10.33, 10.44, 340/825.54, 10.52, 825.63; 455/343, 38.2; 370/311; 342/50, 51, 42

(56) References Cited

U.S. PATENT DOCUMENTS

| | | | |
|---|---|---|---|
| 4,641,374 A | | 2/1987 | Oyama ....................... 455/603 |
| 5,345,231 A | | 9/1994 | Koo et al. ............. 340/870.31 |
| 5,517,194 A | * | 5/1996 | Carroll et al. ................. 342/50 |
| 5,548,291 A | * | 8/1996 | Meier et al. ................... 342/51 |
| 5,686,920 A | * | 11/1997 | Hurta et al. ................... 342/42 |
| 5,847,662 A | * | 12/1998 | Yokota et al. ......... 340/825.54 |
| 5,889,273 A | * | 3/1999 | Goto .......................... 235/492 |
| 6,018,641 A | * | 1/2000 | Tsubouchi et al. ......... 455/38.2 |
| 6,198,382 B1 | * | 3/2001 | Berger et al. ............ 340/10.34 |
| 6,202,927 B1 | * | 3/2001 | Bashan et al. .............. 235/451 |
| 6,282,614 B1 | * | 8/2001 | Musoll ....................... 711/122 |

* cited by examiner

Primary Examiner—Brian Zimmerman
Assistant Examiner—Nam Nguyen
(74) Attorney, Agent, or Firm—Kevin Simons

(57) ABSTRACT

A data carrier (1), or a circuit (2) for such a data carrier (1), which is arranged to receive a carrier signal (CSM) amplitude modulated in conformity with data (DA), is provided with data regenerating means (12) for regenerating data (DA) modulated on the amplitude modulated carrier signal (CSM), and with data processing means (28) for processing data (DA), the data regenerating means (12) additionally including receiving storage means (20) for temporarily storing a predetermined quantity of data (DA), and also detection means (22) for detecting the fact that the predetermined quantity of data (DA) has been buffered in the receiving storage means (20), the detection means (22) being capable of generating control information (CI1) whereby the data processing means (28) can be switched over from a power saving operating mode to a normal operating mode.

22 Claims, 1 Drawing Sheet

DATA CARRIER WITH MEANS FOR REDUCING THE POWER CONSUMPTION UPON RECEPTION OF DATA

FIELD OF THE INVENTION

The invention relates to a data carrier which includes receiver means for receiving an amplitude modulated carrier signal which is amplitude modulated in dependence on data to be received and consists of high segments of high amplitude and pause segments of reduced amplitude, and also includes a circuit which is connected to the receiver means and includes the following means: data regeneration means whereto the received amplitude modulated carrier signal can be applied and whereby the data modulated on the carrier signal can be regenerated, and data processing means whereto the regenerated data can be applied and whereby the regenerated data can be processed.

The invention also relates to a circuit which includes the following means: data regenerating means whereto a received amplitude modulated carrier signal, amplitude modulated in dependence on data to be received and consisting of high segments of high amplitude and pause segments of reduced amplitude, can be applied and whereby the data modulated on the carrier signal can be regenerated, and data processing means whereto the regenerated data can be applied and whereby the regenerated data can be processed.

BACKGROUND

A data carrier of the kind set forth in the first paragraph and a circuit of the kind set forth in the second paragraph are known, for example from the patent document U.S. Pat. No. 5,345,231 A. The known data carrier is a so-called passive data carrier which does not include a separate power supply source but extracts the power required for a data processing operation from the amplitude modulated carrier signal applied to the data carrier, that is to say by means of supply voltage generating means which are formed essentially by a rectifier stage and a voltage control or voltage limiting stage. The data regenerating means in the known data carrier include a demodulator whereby the data modulated on the amplitude modulated carrier signal can be regenerated. The regenerated data can be applied to a control unit which is formed by a microcomputer. Therein, the control unit, i.e. the microcomputer, and storage means constitute data processing means whereto the regenerated data can be applied and whereby the regenerated data can be processed, for example in order to be stored in the storage means.

In the known data carrier, or in the known circuit of this data carrier, in the case of a data receiving operation the data regenerating means as well as the data processing means are activated in a normal operating mode for the entire duration of the data receiving operation, so that the data regenerating means as well as the data processing means require power which is thus consumed; consequently, the supply voltage generating means are loaded to a comparatively high degree during such a data receiving operation. This is problematic notably because during such a data receiving operation practically no power is applied to the data carrier in the pause segments of the amplitude modulated carrier signal but power is consumed nevertheless during these pause segments. Consequently, there is a disadvantageously high power consumption, leading to a reduced range of the data carrier or the circuit.

SUMMARY OF THE INVENTION

It is an object of the invention to avoid the described problems and to provide an improved data carrier and an improved circuit in which the power consumption during a data receiving operation is significantly reduced in comparison with the known data carrier or the known circuit.

In order to achieve the described object a data carrier of the kind set forth in the first paragraph according to the invention is characterized in that with the data regenerating means there are associated receiving storage means which are constructed and arranged to store regenerated data in conformity with a given data quantity, that the data regenerating means additionally include detection means which are capable of detecting the fact that regenerated data in conformity with the given data quantity has been regenerated by the data regenerating means and stored by the receiving storage means, and whereby, upon detection of this fact, control information can be generated and applied to the data processing means, that the data processing means are constructed so that they can be switched between a normal operating mode and a power saving operating mode, that the data processing means can be switched, in dependence on the control information, from their power saving operating mode to their normal operating mode and that when the data processing means are switched to their normal operating mode, the regenerated data stored in the receiving storage means can be transferred to the data processing means.

In order to achieve the described object, a circuit of the kind set forth in the second paragraph according to the invention is characterized in that with the data regenerating means there are associated receiving storage means which are constructed and arranged to store regenerated data in conformity with a given data quantity, that the data regenerating means additionally include detection means which are capable of detecting the fact that regenerated data in conformity with the given data quantity has been regenerated by the data regenerating means and stored by the receiving storage means, and whereby, upon detection of this fact, control information can be generated and applied to the data processing means, that the data processing means are constructed so that they can be switched between a normal operating mode and a power saving operating mode, that the data processing means can be switched, in dependence on the control information, from their power saving operating mode to their normal operating mode and that when the data processing means are switched to their normal operating mode, the regenerated data stored in the receiving storage means can be transferred to the data processing means.

Using only simple means, the steps according to the invention simply ensure that, during a data receiving operation involving a data carrier according to the invention or a circuit according to the invention, only the means which are absolutely required for receiving and regenerating data are activated, i.e. the data regenerating means, whereas the data processing means, having a significant power consumption in their normal operating mode, are practically deactivated during a significant part of a data receiving operation, i.e. switched to an energy saving operating mode, and are switched to their activated state, i.e. their normal operating mode, only during a comparatively short period of time in order to take up regenerated data from the data regenerating means. This results in a very significant saving of power during a data receiving operation by a data carrier according to the invention or a circuit according to the invention; this advantageously leads to a comparatively large range.

Attractive further embodiments of a data carrier according to the invention, or a circuit according to the invention, are characterized by the steps disclosed in the Claims 2 to 10 and 12 to 20.

The above and further aspects of the invention will become apparent from the embodiments described hereinafter and will be illustrated on the basis of these embodiments.

BRIEF DESCRIPTION OF DRAWINGS

The invention will be described in detail hereinafter with reference to an embodiment which is shown in the drawings, however, without the invention being restricted thereto.

DETAILED DESCRIPTION

Figure 1:
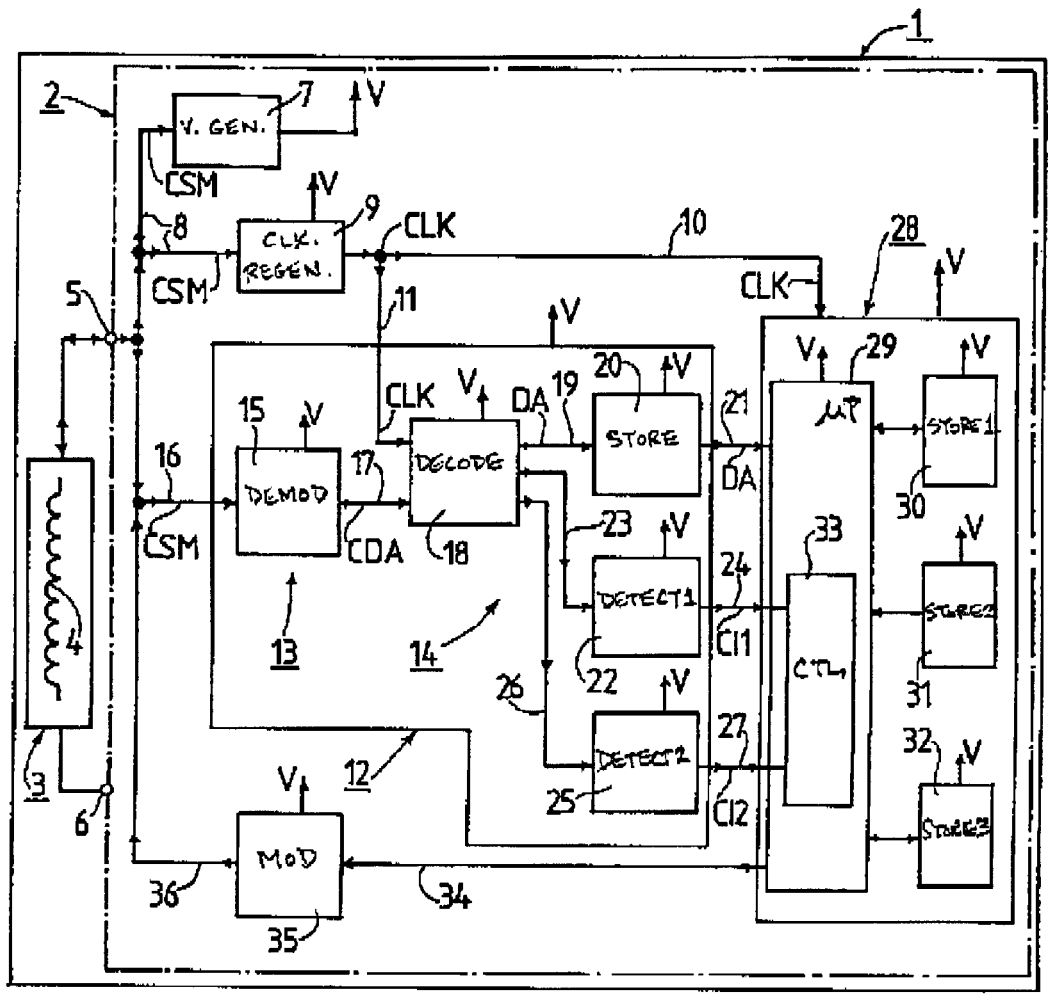
FIG. 1 shows a block diagram of an embodiment of the invention of an in this context essential part of a data carrier and a circuit for this data carrier.

FIG. 1 shows, in the form of a block diagram, an embodiment of a part of a data carrier 1, or a circuit 2 for the data carrier 1, according to the invention. In the present case the data carrier 1 is a so-called chip card. However, the data carrier 1 may also have a different construction; for example, it may be constructed as a so-called tag or a so-called label. The circuit 2 is realized in integrated technology.

Figure 2:
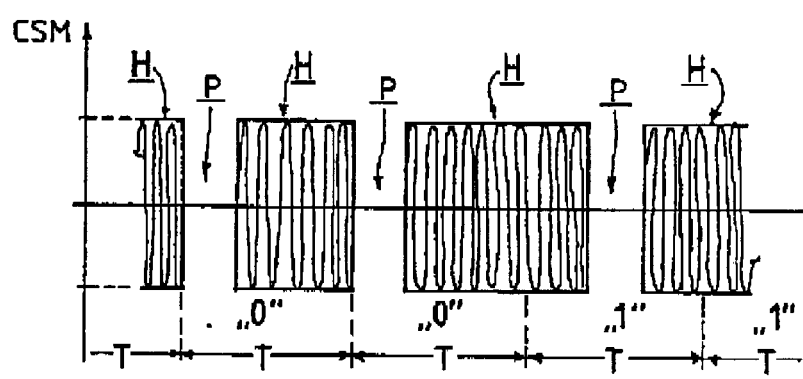
FIG. 2 shows an amplitude modulated carrier signal which is applied to the data carrier of FIG. 1 and is processed therein in the case of a data receiving operation.

The data carrier 1 is provided with receiver means 3 which are arranged to receive an amplitude modulated carrier signal CSM as shown in FIG. 2. The receiver means 3 include a transmitter coil 4 via which the data carrier 1 can communicate inductively with a transmitter coil of a write/read station which is not shown. Such a write/read station can generate an amplitude modulated carrier signal CSM which can be inductively transmitted to the transmitter coil 4 of the receiver means 3 of the data carrier 1. It is to be noted that the receiver means 3 at the same time constitute transmitter means in order to enable, again inductively, communication from the data carrier 1 to a write/read station by way of the transmitter coil 4.

The amplitude modulated carrier signal CSM is amplitude modulated in dependence on data to be received by the data carrier 1. In the case of the amplitude modulated carrier signal CSM as shown in FIG. 2, 100% amplitude modulation is applied. The amplitude modulated carrier signal CSM consists of high segments H of high amplitude and pause segments P of reduced amplitude, the reduced amplitude in the present case being reduced to the value zero due to the 100% amplitude modulation. However, this is not necessarily so; the reduced amplitude in the pause segments P may also have a value which has been reduced by a given percentage relative to the high amplitude of the high segments H, for example an amplitude reduced by 75% or also by only 10%.

As regards the carrier signal CSM of FIG. 2 it is also to be noted that the carrier signal CSM is amplitude modulated in conformity with the so-called Miller code. According to this type of code a fixed time interval T is provided for the encoding of each bit. The encoding of a "0" bit then takes place by fixing a pause segment P at the beginning of such a time interval T and a "1" bit is encoded by fixing a pause segment P at the center of such a time interval T as appears from FIG. 2.

However, it is to be noted that other types of code can also be used for amplitude modulation of a carrier signal for the transmission of data. For example, encoding can also be performed in such a manner that a "0" bit is represented by a high segment H of duration T1 and a "1" bit by a high segment H of a duration T2, pause segments P of fixed pause duration T3 being provided between all high segments H.

However, encoding can also be realized, for example, by providing a fixed time interval T for the encoding of each bit, a "0" bit being encoded by fixing a pause segment P at the start of such a time interval T whereas a "1" bit is encoded by fixing a pause segment at the end of such a time interval T.

The circuit 2 of the data carrier 1 is connected to the receiver means 3; to this end, the circuit 2 includes a first connection contact 5 and a second connection contact 6 which are connected to the receiver means 3.

The circuit 2 includes supply voltage generating means 7 which are connected, via a connection 8, to the first connection contact 5, can receive the received amplitude modulated carrier signal CSM, and are capable of generating, while using the amplitude modulated carrier signal CSM, a DC supply voltage V which serves to supply the entire circuit 2. It is to be noted that the supply voltage generating means 7 include voltage limiting means in order to avoid the occurrence of an excessively high supply voltage V as is known per se.

The data carrier 1 also includes clock signal regenerating means 9 which are also connected to the first connection contact 5 via the connection 8. The clock signal regenerating means 9 are capable of regenerating a clock signal CLK from the received amplitude modulated carrier signal CSM, so that the clock signal CLK is available in the data carrier 1 as well as in the write/read station generating and transmitting the relevant carrier signal CSM. The regenerated carrier signal CLK can be output via a connection 10. Furthermore, the regenerated clock signal CLK is also available via a connection 11 which is branched from the connection 10.

The data carrier 1, or the circuit 2, also include data regenerating means 12 which include an analog section 13 and a digital section 14, can receive the received amplitude modulated carrier signal CSM and are capable of regenerating the data DA modulated on the carrier signal CSM. The analog section 13 includes mainly amplitude demodulation means 15 which are also connected, via a connection 16, to the first connection contact 5 of the circuit 2. The amplitude demodulation means 15 are capable of demodulating the amplitude modulated carrier signal CSM transmitted by a write/read station and received by the transmitter coil 4 of the data carrier 1. After successful amplitude demodulation, the amplitude demodulation means 15 output encoded data CDA via a connection 17.

The digital section 14 of the data regenerating means 12 includes decoding means 18 which can receive the encoded data CDA via the connection 17. Furthermore, the regenerated clock signal CLK can also be applied to the decoding means 18 via the connection 11. The decoding means 18 are arranged to decode the data CDA encoded in conformity with the Miller code. After successful decoding of the encoded data CDA by means of the decoding means 18, the decoding means 18 output regenerated data via a connection 19.

Preferably, with the digital section 14 of the data regenerating means 12 there are associated further receiving storage means 20 which, in the present case, are included in the data regenerating means 12 and can receive, via the connection 19, the regenerated data DA derived by means of the decoding means 18 in order to store the regenerated data DA. The receiving storage means 20 can output the regenerated data DA via a connection 21. The receiving storage means 20 are arranged to store regenerated data in conformity with a given data quantity. In the present case the receiving storage means 20 are arranged to store regenerated data corresponding to one byte, so a data block having a data length of 8 bits, the receiving storage means being formed by a register for storing one byte.

The digital section 14 of the data regenerating means 12 preferably also includes first detection means 22 which are capable of detecting the fact that regenerated data DA in conformity with the given data quantity, corresponding to one byte in the present case, has been regenerated by means of the data regenerating means 12 and stored by the receiving storage means 20. In the present case the first detection means 22 are connected to the decoding means 18 via a connection 23. However, it would alternatively be possible to connect the first detection means 22, via the connection 23, to the connection 19 or, via the connection 23, to the receiving storage means 20. The first detection means 22 are capable of generating, upon detection of the fact that regenerated data DA corresponding to one byte has been regenerated by the data regenerating means 12 and stored by the receiving storage means 20, a first control information CI1 which can be output by the first detection means 22 via a connection 24.

The digital section 14 of the data regenerating means 12 also includes second detection means 25 which are connected to the decoding means 18 via a connection 26. The second detection means 25 are arranged to detect the fact that a data receiving operation has been terminated, i.e. that all data DA to be received by the data carrier 1 during a data receiving operation has been decoded by the decoding means 18. Upon detection of this fact by the second detection means 25, these means generate further control information CI2 for output via a further connection 27.

The circuit 2 of the data carrier 1 also includes data processing means 28. The data processing means 28 can receive the regenerated clock signal CLK via the connection 10. Furthermore, via the connection 21 the data processing means 28 can also receive the regenerated data DA, regenerated by the data regenerating means 12 and temporarily stored in the receiving storage means 20 of the data regenerating means 12. The received regenerated data DA can be processed by the data processing means 28. The data processing means 28 can additionally receive the first control information CI1 via the connection 24 and the second control information CI2 via the connection 27.

The data processing means 28 include a microprocessor 29, first storage means 30, second storage means 31 and third storage means 32. The first storage means 30 are in this case formed by a RAM (random access memory) in which inter alia the regenerated data DA taken over by the data processing means 28 can be temporarily stored. The regenerated data DA, for example may still be present in encrypted form and be temporarily stored in the first storage means (RAM) 30. After completion of the temporary storage in the fist storage means 30, the regenerated data DA, still encrypted, can then be decrypted by means of the microprocessor 29, after which the decrypted data is stored in the third storage means 32. In the present case the third storage means 32 are formed by an EEPROM. Finally it is to be noted that the second storage means 31 are formed by a ROM and are intended meanly for storing a program code.

The microprocessor 29 of the data processing means 28 implements a large number of means and functions which, however, will not be elaborated upon herein for the sake of simplicity. In this context, however, it is to be noted that control means 33 are realized by means of the microprocessor 29. The control means 33 can switch the microprocessor 29, and hence the data processing means 28, between a normal operating mode, in which all components of the data processing means 28 are activated and receive the DC supply voltage V, and a power saving operating mode in which only a minimum part of the microprocessor 29, and hence of the overall data processing means 28, is activated; this minimum part is required to wake up the microprocessor 29, and hence the overall data processing means 28, from the power saving operating mode again. Such waking up of the microprocessor is a step which is known per se.

In respect of the data carrier 1 shown in FIG. 1 it is also to be noted that the power supply voltage generating means 7 are provided with, or co-operate with, a so-called power-on-reset stage which is not shown in FIG. 1. Such a power-on-reset stage has since long been commonly used in data carriers of this kind. When the data carrier 1 enters the communication range of a write/read station and the write/read station outputs a carrier signal, the supply voltage generating means 7 immediately start to generate a DC supply voltage V; after the DC supply voltage V reaches or exceeds a given threshold value, the power-on-reset stage generates a reset signal which is applied to the data processing means 28 and ensures that in the data processing means 28, or in the microprocessor 29, an initialization operation is triggered and executed so that the data processing means 28, or the microprocessor 29, are set to an initial state. After termination of this initialization operation in the data processing means 28, or in the microprocessor 29, it is ensured in the data carrier 1 that the microprocessor 29, and hence the data processing means 28, are automatically switched to their power saving operating mode.

The control means 33 of the microprocessor 29 can receive the first control information CI1 as well as the second control information CI2. The relevant received control information, CI1 or CI2, is evaluated in the control means 33. After reception and evaluation of the first control information CI1, the microprocessor 29, and hence the data processing means 28, can be switched from their power saving operating mode to their normal operating mode in dependence on the first control information CI1. The control means 33 then ensure, after the switching of the microprocessor 29 and the data processing means 28 from their power saving operating state to their normal operating mode in dependence on the first control information CI1, that the microprocessor 29 and the data processing means 28 automatically return to their power saving operating mode, that is to say after a period of time long enough to ensure correct processing of a byte has elapsed.

The construction of the data processing means 28, or of the microprocessor 29 included in the data processing means 28, in the circuit 2 of the data carrier 1 is such that, when the microprocessor 29 is switched to its normal operating mode, and hence when the data processing means 28 are switched to their normal operating mode, the regenerated data DA stored in the receiving storage means 20 can be transferred to the data processing means 28 or the microprocessor 29. As soon as the microprocessor 29 has been switched to its normal operating mode by means of its control means 33, the microprocessor 29 automatically takes up the data DA, which is stored in the receiving storage means 20 formed by a register and corresponds to one byte, via the connection 21. As soon as the transfer of the data DA, corresponding to this byte, and the processing of this data DA, corresponding to this byte, for example the storage in the first storage means (RAM) 30, has been completed, the control means 33 ensure that the microprocessor 29, and hence the data processing means 28, are automatically returned to their power saving operating mode.

In respect of the second detection means 25 of the data regenerating means 12 it is also to be noted that, when the second detection means 25 apply, after a completed data receiving operation, the second control information CI2 to the data processing means 28 via the connection 27, the second control information CI2 is evaluated by means of the control means 33 of the microcomputer 29. After such an evaluation, the control means 33 ensure that the microprocessor 29, or the data processing means 28, are permanently switched to their normal operating mode; the data DA, received and regenerated during the previously executed and terminated data receiving operation, which data DA was stored in the first storage means (RAM) 30 of the data processing means 28 after its temporary storage in the receiving storage means 20, is subjected to a further data processing operation, for example decryption and storage or other data processing operations.

Finally, it is to be noted that data processed by the data processing means 28 and to be applied to a write/read station in the course of a data transmission operation, can be applied by the data processing means 28, via a connection 34, to data preparation means 35 whereby data applied thereto can be brought into a form which is suitable for transmission to a write/read station, after which this data can be applied, via a further connection 36, to the transmitter coil 4 in order to be inductively transmitted, via the transmitter coil 4, to a transmitter coil of a write/read station. After completion of such a data transmission operation, it is ensured in the data carrier 1 that the microprocessor 29, and hence the data processing means 28, are automatically switched or set to their power saving operating mode.

Using simple means, as appears from the foregoing description, in the data carrier 1 of FIG. 1, or in its circuit 2, it is simply ensured that during a data receiving operation only the data regenerating means 12 are continuously activated and hence the supply voltage generating means 7 are loaded only by the data regenerating means 12, whereas the data processing means 28, having a comparatively high power consumption in their normal operating mode, are activated, i.e. controlled to their normal operating mode, only during very short and absolutely necessary periods of time, in which they load the supply voltage generating means 7; however, during a significant part of a data receiving operation they are switched to their power saving operating mode in which they practically do not load the supply voltage generating means 7. In comparison with a known mode of operation in which the data processing means remain in their normal operating mode during the entire data receiving operation, in the data carrier 1, or the circuit 2 of the data carrier 1 shown in FIG. 1, a significant power saving is thus achieved during a data receiving operation.

In a second embodiment of a data carrier 1 according to the invention or a circuit 2 according to the invention (not shown figuratively because purely figuratively they do not deviate from the data carrier 1 or the circuit 2 shown in FIG. 1) the receiving storage means 20 are arranged to store regenerated data DA in conformity with one bit, the receiving storage means 20 being formed by a flip-flop. The control means 33 of the microprocessor 29 in this case ensure, after the switching of the microprocessor 29, or the data processing means 28, from their power saving operating mode to their normal operating mode in dependence on the first control information CI1, that, after such switching over, the data processing means 28, or the microprocessor 29, automatically return to their power saving operating mode, that is to say after a period of time long enough to ensure correct processing of a bit has elapsed.

In a further embodiment of a data carrier 1 or a circuit 2, according to the invention (again not shown figuratively because purely figuratively they do not deviate from the data carrier 1 or the circuit 2 of the data carrier 1 shown in FIG. 1), the receiving storage means 20 are arranged to store regenerated data DA in conformity with a data block consisting of a plurality of bytes. The receiving storage means 20 are then formed by a part of a RAM. It has been found that it is very advantageous when this part of a RAM is formed by a part of the first storage means (RAM) 30 which are included in the data processing means 28 and are associated with the data regenerating means 12 in this case. The control means 33 of the microprocessor 29 in this data carrier 1, or this circuit 2 ensure that, after the switching of the microprocessor 29, or the data processing means 28, from their power saving operating mode to the normal operating mode in dependence on the first control information CI1, the data processing means 28, or the microprocessor 29, automatically return to their power saving operating mode after such switching over, that is to say after a period of time long enough to ensure correct processing of a data block consisting of a plurality of bytes has elapsed.

The advantages already described with reference to the data carrier 1 of FIG. 1, or with reference to the circuit 2 thereof, are also preserved for the above two embodiments of a data carrier 1 according to the invention, or a circuit 2 according to the invention which are not separately shown figuratively.

In the embodiment of a data carrier 1, or a circuit 2, according to the invention as described with reference to FIG. 1, the first control information CI1, output by the first detection means 22, is applied to the control means 33 of the microprocessor 29 and ensure that in the microprocessor the switching over takes place from the power saving operating mode to the normal operating mode. The switching over between the power saving operating mode and the normal operating mode in such a data carrier 1, or such a circuit 2, however, can also be performed in a different manner as will be described in the next paragraph.

In the case of the data carrier 1 of FIG. 1 very simple switching over between the power saving operating mode and the normal operating mode can also be achieved by controlling the supply of the clock signal CLK to the data processing means 28, and hence to the microprocessor 29, that is to say by either enabling the supply or interrupting the supply. When the supply of the clock signal CLK to the data processing means 28 and the microprocessor 29 is interrupted, switching over to the power saving operating mode takes place, because the microprocessor 29 is then deactivated. When the supply of the clock signal CLK to the data processing means 28 and the microprocessor 29 is enabled, however, the normal operating mode is activated since the microprocessor 29 is then activated.

Controlling the supply of the clock signal CLK to the data processing means 28 can be realized, for example in a very simple manner by means of an OR gate which is included in the connection 10 between the clock signal regenerating means 9 and the data processing means 28; a first input of the OR gate can then receive the clock signal CLK output by the clock signal regenerating means 9 whereas a second input of this OR gate can receive the first control information CI1 output by the first detection means 22. The configuration may be such that the OR gate forwards the supplied clock signal CLK when the second input of the OR gate receives a control signal of a low level as the first control information CI1, and that the OR gate causes an interruption of the forwarding of the clock signal CLK when its second input receives a control signal of a high level as the first control information CI1.

The data carrier 1 described with reference to FIG. 1 concerns a data carrier which can communicate with a write/read station in a contactless manner only, i.e. by means of the transmitter coil 4. However, such a data carrier 1 may additionally be provided with means enabling communication, via externally accessible contact pads, with an analogously constructed write/read station.

The data carrier 1 described with reference to FIG. 1 is a so-called passive data carrier which does not have its own power supply source but receives power via the voltage generating means 7. However, the steps proposed by the invention can also be advantageously used for so-called active data carriers in which, for example a power supply source in the form of a battery is provided; the steps according to the invention can then offer a substantial extension of the service life of the battery because of the reduction of the power consumption resulting from the steps according to the invention.

What is claimed is:

1. A data carrier (1) comprising:

receive means (3) for receiving a carrier signal (CSM);

voltage generating means (7), coupled to the receiver means (3), for generating a supply voltage (V) for the data carrier (1) using the carrier signal (CSM), said carrier signal (CSM) being amplitude modulated during a data receiving operation in dependence on data (DA) to be received, said amplitude modulation comprising high segments (H) of high amplitude and pause segments (P) of reduced amplitude, said voltage generating means (7) generating a reduced supply voltage during the data receiving operation due to the amplitude modulation; and a circuit (2), coupled to the receiver means (3), said circuit comprising:

data regenerating means (12) whereto the received amplitude modulated carrier signal (CSM) can be applied during the data receiving operation, and whereby the data (DA) modulated on the carrier signal (CSM) can be regenerated, and data processing means (28) whereto the regenerated data (DA) can be applied and whereby the regenerated data (DA) can be processed, characterized in that with the data regenerating means (12) there, are associated receiving storage means (20) which are constructed and arranged to store regenerated data (DA) in conformity with a given data quantity, that the data regenerating means (12) additionally include detection means (22) which are capable of detecting the fact that regenerated data (DA) in conformity with the given data quantity has been regenerated by the data regenerating means (12) and stored by the receiving storage means (20), and whereby, upon detection of this fact, control information (CI1) can be generated and applied to the data processing means (28), that the data processing means (28) are constructed so that they can be switched between a normal operating mode when the supply voltage (V) is available and a power saving operating mode when the reduced supply voltage is available, that the data processing means (28) can be switched, in dependence on the control information (CI1), from their power saving operating mode to their normal operating mode, and that the data processing means (28) are switched to their normal operating mode, the regenerated data (DA) stored in the receiving storage means (20) can be transferred to the data processing means (28).

2. A data carrier (1) as claimed in claim 1, characterized in that the receiving storage means (20) are arranged to store regenerated data (DA) in conformity with one bit.

3. A data carrier (1) as claimed in claim 2, characterized in that the receiving storage means (20) are formed by a flip-flop.

4. A data carrier (1) as claimed in claim 2, characterized in that the data processing means (28) are arranged to return automatically, after switching over from their power saving operating mode to their normal operating mode in dependence on the control information (CI1), to their power saving operating mode after a period of time long enough to ensure correct processing of one bit has elapsed.

5. A data carrier (1) as claimed in claim 1, characterized in that the receiving storage means (20) are arranged to store regenerated data (DA) in conformity with one byte.

6. A data carrier as claimed in claim 5, characterized in that the receiving storage means (20) are formed by a register for storing one byte.

7. A data carrier as claimed in claim 5, characterized in that the data processing means (28) are arranged to return automatically, after switching over from their power saving operating mode to their normal operating mode in dependence on the control information (CI1), to their power saving operating mode after a period of time long enough to ensure correct processing of one byte has elapsed.

8. A data carrier (1) as claimed in claim 1, characterized in that the receiving storage means (20) are arranged to store regenerated data (DA) in conformity with a data block consisting of a plurality of bytes.

9. A data carrier (1) as claimed in claim 8, characterized in that the receiving storage means (20) are formed by a part of a RAM (random access memory).

10. A data carrier (1) as claimed in claim 8, characterized in that the data processing means (28) are arranged to return automatically, after switching over from their power saving operating mode to their normal operating mode in dependence on the control information (CI1), to their power saving operating mode after a period of time long enough to ensure correct processing of a data block consisting of a plurality of bytes has elapsed.

11. A circuit (2) powered by a supply voltage generated using a carrier signal (CSM), said supply voltage being reduced during a data receiving operation due to amplitude modulation of the carrier signal, said circuit (2) comprising:

data regenerating means (12) to receive the amplitude modulated carrier signal (CSM) during the data receiving operation, said amplitude modulated carrier signal (CSM) being amplitude modulated in dependence on data (DA) to be received and consisting of high segments (H) of high amplitude and pause segments (P) of reduced amplitude, whereby the data (DA) modulated on the carrier signal (CSM) can be regenerated; and data processing means (28) whereto the regenerated data (DA) can be applied and whereby the regenerated data (DA) can be processed, characterized in that with the data regenerating means (12) there are associated receiving storage means (20) which are constructed and arranged to store regenerated data (DA) in conformity with a given data quantity, that the data regenerating means (12) additionally include detection means (22) which are capable of detecting the fact that regenerated data (DA) in conformity with the given data quantity has been regenerated by the data regenerating means (12) and stored by the receiving storage means (20), and whereby, upon detection of this fact, control information (CI1) can be generated and applied to the data processing means (28), that the data processing means (28) are constructed so that they can be switched between a normal operating mode when the supply voltage is not reduced and a power saving operating mode when the supply voltage is reduced, that the data processing means (28) can be switched, in dependence on the control information (CI1), from their power saving operating mode to their normal operating mode, and that when the data processing means (28) are switched to their normal operating mode, the regenerated data (DA) stored in the receiving storage means (20) can be transferred to the data processing means (28).

12. A circuit (2) as claimed in claim 11, characterized in that the receiving storage means (20) are arranged to store regenerated data (DA) in conformity with one bit.

13. A circuit (2) as claimed in claim 12, characterized in that the receiving storage means (20) are formed by a flip-flop.

14. A circuit (2) as claimed in claim 12, characterized in that the data processing means (28) are arranged to return automatically, after switching over from their power saving operating mode to their normal operating mode in dependence on the control information (CI1), to their power saving operating mode after a period of time long enough to ensure correct processing of one bit has elapsed.

15. A circuit (2) as claimed in claim 11, characterized in that the receiving storage means (20) are arranged to store regenerated data (DA) in conformity with one byte.

16. A circuit (2) as claimed in claim 15, characterized in that the receiving storage means (20) are formed by a register for storing one byte.

17. A circuit (2) as claimed in claim 15, characterized in that the data processing means (28) are arranged to return automatically, after switching over from their power saving operating mode to their normal operating mode in dependence on the control information (CI1), to their power saving operating mode after a period of time long enough to ensure correct processing of one byte has elapsed.

18. A circuit (2) as claimed in claim 11, characterized in that the receiving storage means (20) are arranged to store regenerated data (DA) in conformity with a data block consisting of a plurality of bytes.

19. A circuit (2) as claimed in claim 18, characterized in that the receiving storage means (20) are formed by a part of a RAM.

20. A circuit arrangement (2) as claimed in claim 18, characterized in that the data processing means (28) are arranged to return automatically, after switching over from their power saving operating mode to their normal operating mode in dependence on the control information (CI1), to their power saving operating mode after a period of time long enough to ensure correct processing of a data block consisting of a plurality of bytes, has elapsed.

21. A method of receiving data in an IC data transponder including a processor, the method comprising:

detecting that an increment of data has been received, and providing a first signal to the processor to cause the processor to retrieve the increment of data;

repeating the preceding step some number of times;

detecting that a last increment of data has been received, and providing a second signal to the processor;

wherein the processor occupies a low power state, leaves the low power state in response to the first signal and in response to the second signal, and thereafter returns to the low power state.

22. An IC data transponder comprising:

a processor having a low power state;

a data receiver;

means for detecting that an increment of data has been received, and providing a first signal to the processor to cause the processor to retrieve the increment of data;

means for detecting that a last increment of data has been received, and providing a second signal to the processor;

wherein the processor occupies the low power state, leaves the low power state in response to the first signal and in response to the second signal, and thereafter returns to the low power state.

* * * * *